US007647675B2

(12) United States Patent
Ach

(10) Patent No.: US 7,647,675 B2
(45) Date of Patent: Jan. 19, 2010

(54) SUSPENSION MEANS END CONNECTOR FOR AN ELEVATOR

(75) Inventor: Ernst Ach, Ebikon (CH)

(73) Assignee: Inventio AG, Hergiswil (CH)

( * ) Notice: Subject to any disclaimer, the term of this patent is extended or adjusted under 35 U.S.C. 154(b) by 421 days.

(21) Appl. No.: 11/512,655

(22) Filed: Aug. 30, 2006

(65) Prior Publication Data

US 2007/0051564 A1 Mar. 8, 2007

(30) Foreign Application Priority Data

Sep. 2, 2005 (EP) ................................ 05108091

(51) Int. Cl.
*F16G 11/04* (2006.01)

(52) U.S. Cl. .................... 24/129 R; 24/136 R; 187/411

(58) Field of Classification Search ............... 24/115 R, 24/136 R, 136 K, 115 M, 115 J, 129 R, 129 B; 187/411, 412, 349, 414, 251, 254, 266, 264, 187/404, 350, 373; 403/211, 314, 374.1
See application file for complete search history.

(56) References Cited

U.S. PATENT DOCUMENTS 5,199,137 A * 4/1993 Edwards ................... 24/136 K
6,345,419 B1 2/2002 Traktovenko
6,484,368 B1 11/2002 Rivera et al.

FOREIGN PATENT DOCUMENTS

CH 556795 12/1974

* cited by examiner

*Primary Examiner*—James R Brittain
(74) *Attorney, Agent, or Firm*—Ladas & Parry LLP

(57) ABSTRACT

A suspension belt end connector has first and second wrapping elements that are arranged in a housing. The housing may have a back wall, side walls and an open side opposite to the back wall. The side walls taper and form with the back wall and a yoke a suspension unit to accommodate a suspension bolt. The end connector supports a poly V belt which serves as a suspension element. The belt is laid around the first wrapping element in a first loop, around the second wrapping element in a second loop, and again around the first wrapping element in a third loop that runs opposite to the first loop. The end of the belt is then held fast by means of a clamp or wedging device. Ribs of the first and third loops mutually engage, as a result of which the coefficient of friction in the engaged section of the belt is increased.

14 Claims, 2 Drawing Sheets

SUSPENSION MEANS END CONNECTOR FOR AN ELEVATOR

The invention relates to a suspension means end connector for an elevator that serves the purpose of transmitting forces that arise in a suspension means to a suspension structure or of transmitting forces that arise in the suspension structure to the suspension means, the transmission of force taking place by means of friction between the suspension means and at least one wrapping element that is wrapped by the suspension means.

BACKGROUND OF THE INVENTION

From patent specification CH 556 795 an end fastening for a spring-steel band used in an elevator installation has become known. The end fastening consists of a housing with a wedge cover in which a wedge body is arranged. The housing is a hollow cast body that is tapered in the direction of the load. The spring-steel band is passed over the wedge body and at its end is held by means of a band holder and wedged fast between the wedge-shaped wedge body and the wedge cover of the housing.

A disadvantage of the known device is that to transmit force from the spring-steel band onto the housing, an elaborate construction of the wedge body and of the wedge cover with embedding layer is needed.

BRIEF DESCRIPTION OF THE INVENTION

The present invention provides a suspension means end connector having at least two wrapping elements about which the suspension means, such as a belt, is wrapped. One of the wrapping elements is wrapped with an overlapping pair of suspension-means loops running in opposite directions, a second wrapping element is wrapped with a single loop of the suspension means. Such a construction provides a solution for avoiding the disadvantages of the known device, and creates a suspension means end connector that, with a simple construction, can absorb large forces from, or transmit large forces to, the suspension means.

The advantages achieved by means of the invention are mainly to be seen in that with the frictionally engaged suspension means end connector according to the invention the wedge effect increases as the tensile force increases. As a consequence of the multiple reversal of the suspension means, a wrap of more than 180° occurs, sections of suspension means on suspension means of opposite direction and a high coefficient of friction being thereby provided. Furthermore, the suspension means end connector according to the invention is easily released.

BRIEF DESCRIPTION OF THE DRAWINGS

The present invention is described in more detail in the following detailed description of embodiments thereof and the attached figures, wherein.

DETAILED DESCRIPTION OF THE INVENTION

Figure 1:
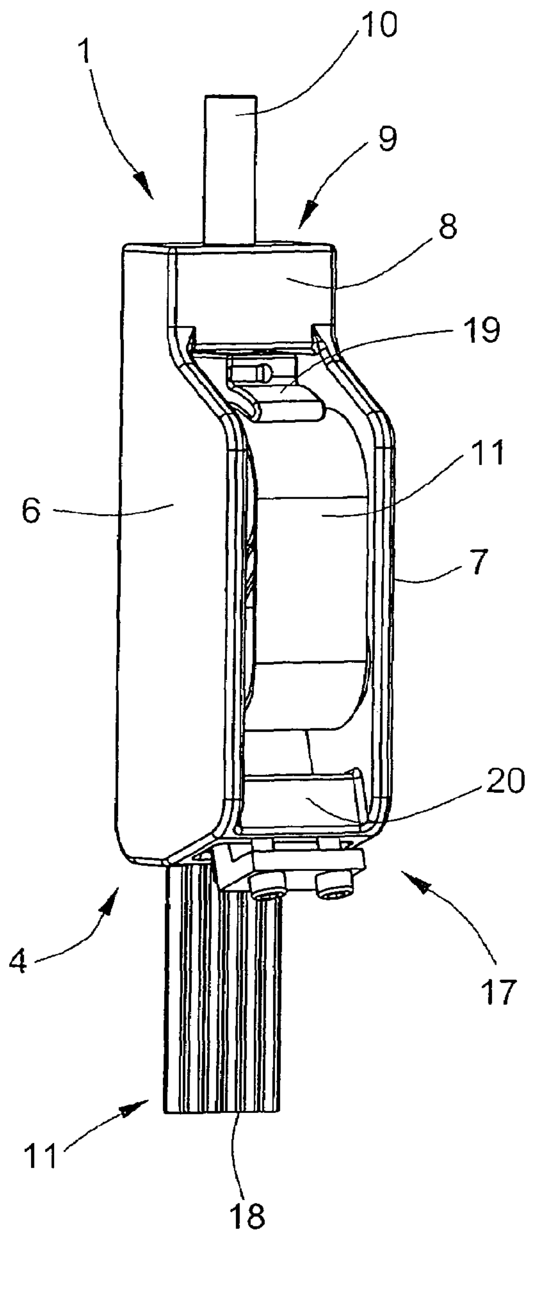
FIG. 1 is a perspective view of a suspension end connector in accordance with the invention, wherein the wrapping elements are arranged in a fixed manner.
Figure 2:
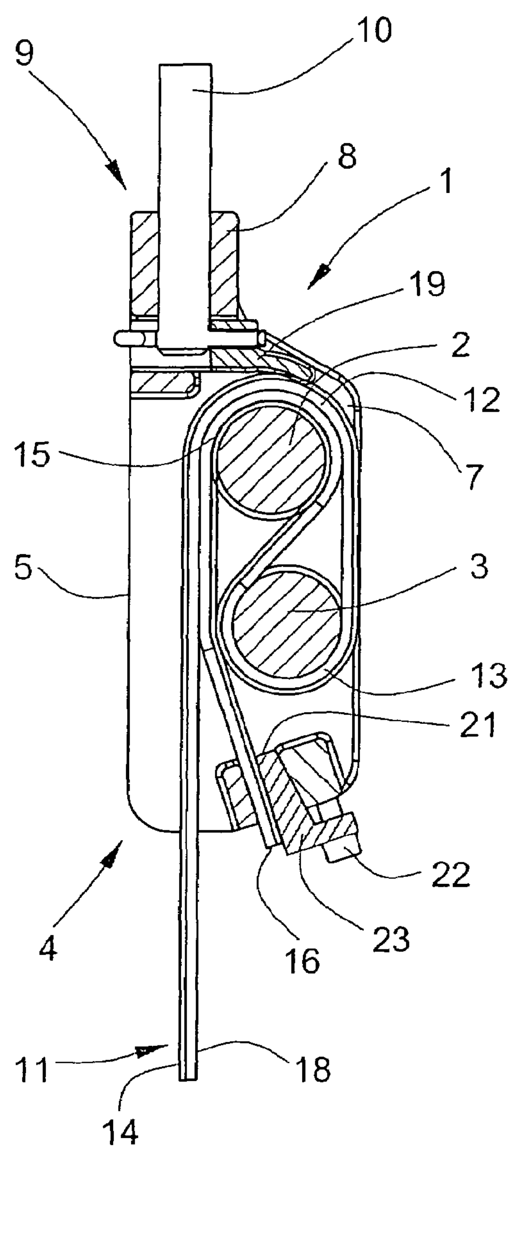
FIG. 2 is a section view of the suspension end connector of FIG. 1.

FIGS. 1 and 2 show a suspension means end connector 1 consisting of a first cylindrical wrapping element 2 and a second cylindrical wrapping element 3 that are arranged fast in a housing 4. The housing 4 and the wrapping elements 2, 3 together can take the form of a monolithic casting, or the wrapping elements 2, 3 can be welded to the housing. The housing consists essentially of a back wall 5, a first side wall 6, and a second side wall 7. The side of the housing that is opposite to the back wall 5 is open. In the upward direction the side walls 6, 7 taper, and form together with the back wall 5 and a yoke 8 a suspension element 9 to accommodate a suspension bolt 10. The suspension bolt 10 is connected to a suspension structure of an elevator. The suspension bolt 10 can, for example, be connected to a suspension means hitch point arranged in the top of the elevator hoistway. If the suspension means end connector 1 is inverted, a yoke of the elevator car, or a frame of the counterweight, for example, serves as a suspension structure for the suspension bolt 10.

Figure 5:
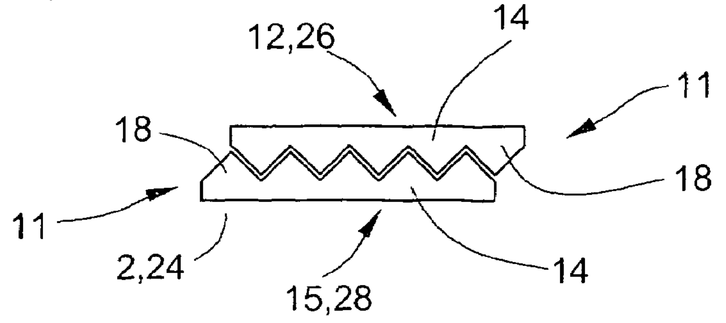
FIG. 5 is a detail view of the oppositely running belt loops about a first wrapping element.

Provided as suspension means 11 is a poly V belt 11. Other suspension means, such as flat belts or toothed belts, are also possible. The belt 11 is laid around the first wrapping element 2 in a first loop 12 and then in a second loop 13, around the second wrapping element 3, with the back of the belt 14 facing away from the wrapping elements 2, 3. In a third loop 15 that runs in an opposite sense to the first loop 12, the belt 11 is passed again over the first wrapping element 2 and the end 16 of the belt 11 is then held fast by means of a wedging device 17 that lies opposite to the suspension element 9. As shown in FIG. 5, the belt ribs 18 of the first loop 12 and its ribs 18 of the third loop 15 mutually engage in the overlying section, as a result of which the coefficient of friction in this section is additionally increased.

A lug 19 that is connected to the suspension bolt 10 serves to prevent rotation of the suspension bolt 10 and keeps the loops 12, 13, 15 taut should the belt 11 be slack.

The wedging device 17 consists of a lug 20 that is arranged on the housing 4 and has a breakthrough or gap 21 for the end of the belt 16 and for a wedge 23 that can be adjusted by means of a screw 22 and that wedges the end of the belt 16 fast to the lug 20. The wedging at the end of the belt 16 increases safety with respect to slipping of the belt under an oscillating load.

Figure 3:
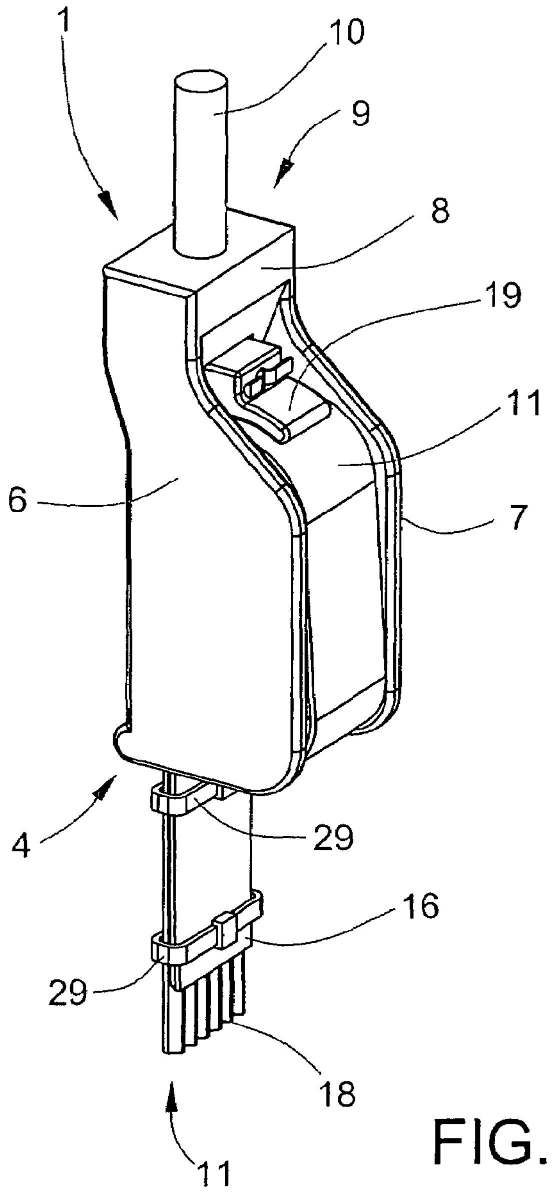
FIG. 3 is a perspective view of a suspension end connector of the invention with fixed and movable wrapping elements.
Figure 4:
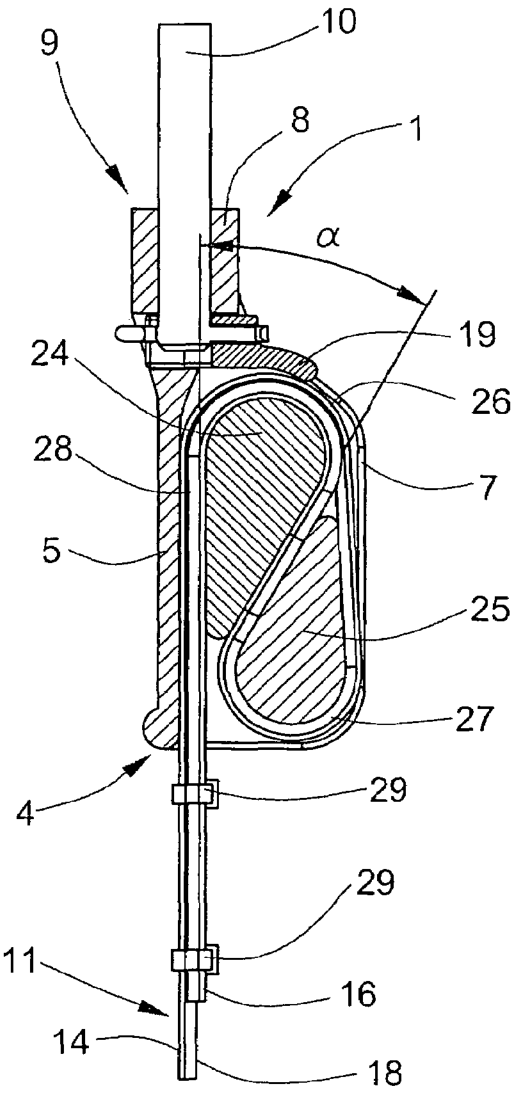
FIG. 4 is a section view of the suspension end connection of FIG. 3.

FIGS. 3 and 4 show a suspension means end connector 1 consisting of a third wrapping element 24 and a fourth wrapping element 25 that are arranged in the housing 4, the third wrapping element 24 being movable and the fourth wrapping element 25 being connected in fixed manner with the housing 4. The housing 4, along with the fourth wrapping element 25, can take the form of a monolithic casting. Otherwise, the housing 4 of FIGS. 3 and 4 is constructed in a similar manner to the housing 4 of FIGS. 1 and 2 except for the wedging device 17. The wrapping elements 24, 25 are executed with a wedge-shaped cross section.

Provided as suspension means 11 is a poly V belt 11. Other suspension means such as, for example, flat belts or toothed belts are also possible. In a fourth loop 26, the belt 11 is laid around the third wrapping element 24 and then in a fifth loop 27 around the fourth wrapping element 25, the back of the belt 14 facing away from the wrapping elements 24, 25. In a sixth loop 28 that runs opposite to the fourth loop 26, the belt 11 is again passed over the third wrapping element 24, and the end 16 of the belt 11 is then held fast to a portion of the belt itself by means of bands 29 that are passed around the belt 11. As again shown in FIG. 5, the ribs 18 of the fourth loop 26 and the ribs 18 of the sixth loop 28 mutually engage, as a result of which the coefficient of friction in this section is additionally increased. The double wrapped third wrapping element 24 supports itself by means of the portions of belt 11 on the single wrapped fourth wrapping element 25 and along the back wall 5 of the housing 4. In cross-section, the wrapping elements 24, 25 have the shape of a wedge with angle $\alpha$ of, for example, 30°.

A lug 19 that is connected to the suspension bolt 10 serves to prevent rotation of the suspension bolt 10 and keeps the loops 26, 27, 28 taut should the belt 11 become slack.

FIG. 5 shows the oppositely running loops 12, 15 of the first wrapping element 2 and the oppositely running loops 26, 28 of the fourth wrapping element 24, respectively. The belt ribs 18 of the oppositely threaded loops 12, 15, 26, and 28 mutually engage, the loops being mutually offset by half a rib 18 in the crosswise direction. Instead of the ribs being aligned against each other, as a variant embodiment the belt 11 can also be aligned in a back 14 to back 14 manner. The rib material can be different than the back material, allowing different coefficients of friction to be produced and different belt tensions to be absorbed.

To improve the coefficient of friction, the second wrapping element 3 and the fourth wrapping element 25, respectively can have longitudinal grooves into which the belt ribs 18 fit.

The end of the suspension means can also be passed over at least one further pair of wrapping elements, one of the wrapping elements being again double and oppositely wrapped and one wrapping element being single wrapped as described above.

I claim:

1. A suspension means end connector for an elevator of the type that transmits force between a suspension means and a suspension structure, the transmission of force taking place by means of friction between the suspension means and at least one wrapping element of the end connector that is wrapped by the suspension means, an end length of the suspension means adjacent an end of the suspension means being within the connector the end connector comprising:

at least two wrapping elements, one of the wrapping elements being wrapped with a first portion of the suspension means end length in the form of a first loop having a loop length running in a first sense about the wrapping element and first contacting the wrapping element in a first direction and with a second portion of the suspension means end length in the form of a second loop substantially overlying and contacting a substantial portion of the first loop length and running in an opposite sense to the first suspension means loop, a second other wrapping element being wrapped with a single loop of the end length of the suspension means: the end length of the suspension means entering and exiting the connector at a same end and in opposite directions.

2. The suspension means end connector according to claim 1, wherein at least one wrapping element is mounted in a fixed manner in the connector.

3. The suspension means end connector according to claim 2, wherein at least one wrapping element is mounted in a movable manner in the connector.

4. The suspension means end connector according to claim 1, 2 or 3, wherein at least two wrapping elements are cylindrical.

5. The suspension means end connector according to claim 1, 2 or 3, wherein at least two wrapping elements have a wedge-shaped cross section.

6. The suspension means end connector according to claim 1 or 2, wherein the suspension means is a poly V belt having a belt back and ribs, the ribs of the first and second loops being mutually engaged.

7. The suspension means end connector according to claim 4, wherein the suspension means is a poly V belt having a belt back and ribs, the ribs of the first and second loops being mutually engaged.

8. The suspension means end connector according to claim 5, wherein the suspension means is a poly V belt having a belt back and ribs, the ribs of the first and second loops being mutually engaged.

9. The suspension means end connector according to claim 6, wherein at least one wrapping element has lengthwise grooves into which the belt ribs fit.

10. The suspension means end connector according to claim 7, wherein at least one wrapping element has lengthwise grooves into which the belt ribs fit.

11. The suspension means end connector according to claim 8, wherein at least one wrapping element has lengthwise grooves into which the belt ribs fit.

12. The suspension means end connector according to claim 1 or 2, further comprising a housing with a back wall and side walls is provided within which at least one wrapping element is mounted.

13. Suspension means end connector according to claim 12, further comprising a yoke and a suspension bolt, wherein the side walls taper in an upward direction and form, together with the back wall and the yoke, a suspension element to accommodate the suspension bolt.

14. The suspension means end connector according to claim 13, further comprising a lug connected to the suspension bolt to prevent rotation of the suspension bolt and maintain the loops of the suspension means taut in the event of slackness in the suspension means.

* * * * *